(12) United States Patent
Xu

(10) Patent No.: US 12,273,622 B2
(45) Date of Patent: Apr. 8, 2025

(54) PHOTOGRAPHING METHOD AND ELECTRONIC DEVICE

(71) Applicant: Honor Device Co., Ltd., Shenzhen (CN)

(72) Inventor: Jirun Xu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/273,276

(22) PCT Filed: Dec. 20, 2022

(86) PCT No.: PCT/CN2022/140192
§ 371 (c)(1),
(2) Date: Jul. 20, 2023

(87) PCT Pub. No.: WO2023/160169
PCT Pub. Date: Aug. 31, 2023

(65) Prior Publication Data
US 2024/0406556 A1 Dec. 5, 2024

(30) Foreign Application Priority Data

Feb. 25, 2022 (CN) .......................... 202210181416.2

(51) Int. Cl.
H04N 23/68 (2023.01)
H04N 1/21 (2006.01)
(Continued)

(52) U.S. Cl.
CPC ....... *H04N 23/6812* (2023.01); *H04N 1/2145* (2013.01); *H04N 23/632* (2023.01);
(Continued)

(58) Field of Classification Search
None
See application file for complete search history.

(56) References Cited

U.S. PATENT DOCUMENTS

2006/0012699 A1* 1/2006 Miki .................... H04N 23/683
348/333.01
2008/0129854 A1* 6/2008 Onoda ................. H04N 1/2145
348/E9.01
(Continued)

FOREIGN PATENT DOCUMENTS

CN 107172296 A 9/2017
CN 107509034 A 12/2017
(Continued)

*Primary Examiner* — Paul M Berardesca
(74) *Attorney, Agent, or Firm* — Leydig, Voit & Mayer, Ltd.

(57) ABSTRACT

This application discloses a photographing method and an electronic device. The method includes: obtaining N frames of images in response to a first operation, where the first operation is an operation performed on a photographing control, the N frames of images are N frames of images in a preview picture that are collected by using a camera, and N is a positive integer; and determining a target image as an output raw image in a process of sequentially obtaining jitter amounts of all of the N frames of images, where the raw image is an image obtained by an electronic device by using a sensor of the camera, and the target image is an image that meets a jitter amount requirement and that is determined from the N frames of images based on the jitter amounts. Sharpness of a raw image can be ensured, thereby improving photographing experience of users.

7 Claims, 8 Drawing Sheets

(51) Int. Cl.
*H04N 23/60* (2023.01)
*H04N 23/63* (2023.01)
*H04N 23/951* (2023.01)
*H04N 101/00* (2006.01)
*H04N 23/80* (2023.01)

(52) U.S. Cl.
CPC ........... *H04N 23/64* (2023.01); *H04N 23/951* (2023.01); *H04N 23/689* (2023.01); *H04N 23/80* (2023.01); *H04N 2101/00* (2013.01); *H04N 2201/0084* (2013.01)

(56) References Cited

U.S. PATENT DOCUMENTS

| | | | |
|---|---|---|---|
| 2010/0309335 | A1 | 12/2010 | Brunner et al. |
| 2014/0085495 | A1* | 3/2014 | Almalki ............... H04N 23/667 348/208.6 |
| 2017/0187961 | A1* | 6/2017 | Katz ................. H04N 23/6812 |
| 2020/0260008 | A1 | 8/2020 | Kim et al. |

FOREIGN PATENT DOCUMENTS

| | | |
|---|---|---|
| CN | 110049244 A | 7/2019 |
| CN | 110266966 A | 9/2019 |
| CN | 110290323 A | 9/2019 |

* cited by examiner (A)

(B)

PHOTOGRAPHING METHOD AND ELECTRONIC DEVICE

CROSS-REFERENCE TO RELATED APPLICATIONS

This application is a national stage of International Application No. PCT/CN2022/140192, filed on Dec. 20, 2022, which claims priority to Chinese Patent Application No. 202210181416.2, filed on Feb. 25, 2022, both of which are hereby incorporated by reference in their entireties.

TECHNICAL FIELD

This application relates to the field of terminal technologies, and in particular, to a photographing method and an electronic device.

BACKGROUND

In daily life, it has become a habit for a user to take a photo by using a mobile phone. A camera of the mobile phone often presents, to a sensor, light passing through a lens, to form a raw image, and then performs image signal processing (ISP) and post algorithm processing on the raw image and presents a processed image to the user.

When the user takes a photo by using the mobile phone, a captured raw image is blurry due to problems such as natural shaking of the user's hand, a focusing location of the camera, movement of the user, and rapid movement of a photographed object.

SUMMARY

Embodiments of this application disclose a photographing method and an electronic device, to ensure sharpness of a raw image, thereby improving photographing experience of a user.

According to a first aspect, this application provides a photographing method. The method is applied to an electronic device and includes: obtaining N frames of images in response to a first operation, where the first operation is an operation performed on a photographing control, the N frames of images are N frames of images in a preview picture that are collected by using a camera, and N is a positive integer; and determining a target image as an output raw image in a process of sequentially obtaining jitter amounts of all of the N frames of images, where the raw image is an image obtained by the electronic device by using a sensor of the camera, and the target image is an image that meets a jitter amount requirement and that is determined from the N frames of images based on the jitter amounts.

In this embodiment of this application, before performing image processing, the electronic device can select and identify the N frames of images obtained by the electronic device, so that an image with a large jitter amount can be filtered out, thereby improving sharpness of the output raw image. Therefore, an image obtained after post-processing has higher sharpness and quality, so that sharpness of an image captured by the electronic device can be improved, thereby improving photographing experience of a user.

In a possible implementation, the determining a target image as an output raw image specifically includes: extracting a first image from the N frames of images; obtaining a jitter amount of the first image; and when the jitter amount of the first image is less than or equal to a preset threshold, determining the first image as the target image; when the jitter amount of the first image is greater than the preset threshold, extracting a next frame of the N frames of images as a new first image, and performing the step of obtaining a jitter amount of the first image; or when the jitter amounts of all the N frames of images are greater than the preset threshold, determining an image with a minimum jitter amount in the N frames of images as the target image. In this way, an image meeting the preset threshold can be first selected as the output raw image as far as possible. If no image in the N frames of images meets the preset threshold, an image with a minimum jitter amount is selected. The electronic device ensures sharpness of the selected raw image as far as possible, thereby improving photographing experience of a user.

In a possible implementation, the obtaining N frames of images in response to a first operation specifically includes: in response to the first operation, determining a moment of the first operation as a first moment; and obtaining consecutive N frames of images from the sensor starting from first duration before the first moment. In this way, in order that an image captured by the electronic device is a picture that a user wants to capture, in the process of obtaining the first image, it is required to take into account a delay from pressing the photographing control by the user to exposing the picture by the electronic device. A first delay may be used to ensure that the N frames of images are the picture that the user wants to capture, thereby improving photographing experience of the user.

In a possible implementation, the obtaining a jitter amount of the first image specifically includes: obtaining gyro data of M lines in the first image, where M is a positive integer, and M is less than or equal to a quantity of pixel lines of the first image; and determining the jitter amount of the first image based on the gyro data of the M lines. In this way, the electronic device can calculate a jitter amount of a frame of image in the sensor, and an image with better quality can be selected, for processing by the electronic device, from a plurality of frames of images only when jitter amounts of the plurality of frames of images are calculated, so that an image seen by a user can be clearer.

In a possible implementation, the obtaining gyro data of M lines in the first image specifically includes: obtaining exposure time information of the M lines in the first image, where the exposure time information includes start moments and end moments of exposure of the M lines; obtaining timestamp information and corresponding gyro data, where the timestamp information is information about time of collecting the corresponding gyro data; and when the timestamp information is in exposure time information of a corresponding line in the M lines, obtaining gyro data in the exposure time information of the corresponding line. In this way, the gyro data is selected based on the timestamp information and the exposure time information, which can ensure a shaking situation of a user when the first image is exposed, thereby ensuring accuracy of the gyro data in terms of time, and further ensuring accuracy of the obtained jitter amount.

In a possible implementation, the determining the jitter amount of the first image based on the gyro data of the M lines specifically includes: representing gyro data of an ith line in the M lines by using a jitter function $F_i$:

$$F_i = [g_{i1}, g_{i2}, \ldots, g_{in}, \ldots, g_{ij}]$$

where j indicates that exposure of the ith line has gyro data corresponding to a total of j pieces of timestamp information;

integrating Q dimensions of gyro data corresponding to an nth piece of timestamp information in the j pieces of timestamp information of each of the M lines, to obtain a spatial location p in corresponding to the nth piece of timestamp information of the ith line:

$$p_{in} = f * \sum_{1}^{Q} g_{ink} \cdot \Delta t_{in}$$

where f is a focal length, k is an integer from 1 to Q, $g_{i\,n\,k}$ is data of a kth dimension in the gyro data in the nth piece of timestamp information of the ith line, and $\Delta t_{i\,n}$ is a time difference between the nth piece of timestamp information and a previous piece of timestamp information of the ith line;

determining a location function $p_i$ of the ith line based on the spatial location corresponding to each piece of timestamp information of the ith line:

$$P_i = [0, p_{i1}, p_{i2}, \ldots, p_{ij}]$$

where $p_{i\,j}$ represents the spatial location of the gyro data $g_{i\,j}$ corresponding to the jth piece of timestamp information of the ith line;

determining the jitter amount $S_i$ of the ith line as a difference between a maximum value and a minimum value in the location function $p_i$ of the ith line:

$$S_i = \max(pi) - \min(pi)$$

where max(pi) is a maximum value in j location functions of the ith line, and min(pi) is a minimum value in the j location functions of the ith line; and determining the jitter amount S of the first image as an average value of jitter amounts of the M lines:

$$S = \frac{1}{M}\sum_{1}^{M} S_i.$$

In this way, the electronic device can efficiently calculate the jitter amount of each frame of image, to prepare for subsequent identification and selection, thereby ensuring integrity and reliability of the solution.

In a possible implementation, the method further includes: obtaining an optical compensation amount corresponding to each piece of timestamp information of the ith line. The determining a location function $p_i$ of the ith line based on the spatial location corresponding to each piece of timestamp information of the ith line further includes:

determining, based on the spatial location and the optical compensation amount that correspond to each piece of timestamp information of the ith line, that the location function $p_i$ of the ith line is:

$$p_i = [0, p_{i1} - o_{i1}, p_{i2} - o_{i2}, \ldots, p_{ij} - o_{ij}]$$

where $o_{i\,j}$ is the optical compensation amount corresponding to the jth piece of timestamp information of the ith line.

In this way, in a process of obtaining a jitter amount, the electronic device having an optical compensation capability takes the optical compensation amount into account in advance and processes the optical compensation amount in advance, to ensure accuracy of an obtained jitter amount of a frame of image.

In a possible implementation, the preset threshold ranges from 0.1 pixels to 1.0 pixel. In this way, the preset threshold can be used to effectively select the current first image. When the jitter amount is small, it indicates that the frame of image has a low jitter degree, and jitter of the electronic device cannot cause blurring of the frame of image. Therefore, the frame of image can be output from the sensor for subsequent processing, thereby ensuring sharpness and quality of the image.

According to a second aspect, this application provides an electronic device, including: a touchscreen, one or more processors, and one or more memories. The one or more memories are configured to store computer program code, and the computer program code includes computer instructions. When the one or more processors execute the computer instructions, the electronic device is enabled to perform the following operations:

obtaining N frames of images in response to a first operation, where the first operation is an operation performed on a photographing control, the N frames of images are N frames of images in a preview picture that are collected by using a camera, and N is a positive integer; and determining a target image as an output raw image in a process of sequentially obtaining jitter amounts of all of the N frames of images, where the raw image is an image obtained by the electronic device by using a sensor of the camera, and the target image is an image that meets a jitter amount requirement and that is determined from the N frames of images based on the jitter amounts.

In this embodiment of this application, before performing image processing, the electronic device can select and identify the raw images obtained by the electronic device, so that an image with a large jitter amount can be filtered out, thereby improving sharpness of the raw image. Therefore, quality of an image captured by the electronic device can be improved, thereby improving photographing experience of a user.

In a possible implementation, the determining a target image as an output raw image is specifically performed as follows: extracting a first image from the N frames of images; obtaining a jitter amount of the first image; and when the jitter amount of the first image is less than or equal to a preset threshold, determining the first image as the target image; when the jitter amount of the first image is greater than the preset threshold, extracting a next frame of the N frames of images as a new first image, and performing the step of obtaining a jitter amount of the first image; or when the jitter amounts of all the N frames of images are greater than the preset threshold, determining an image with a minimum jitter amount in the N frames of images as the target image. In this way, an image meeting the preset threshold can be first selected as the output raw image as far as possible. If no image in the N frames of images meets the preset threshold, an image with a minimum jitter amount is selected. In this way, the electronic device ensures sharpness of the selected raw image as far as possible, thereby improving photographing experience of a user.

In a possible implementation, the obtaining N frames of images in response to a first operation is specifically performed as follows: in response to the first operation, determining a moment of the first operation as a first moment; and obtaining consecutive N frames of images from the sensor starting from first duration before the first moment. In this way, in order that an image captured by the electronic device is a picture that a user wants to capture, in the process of obtaining the first image, it is required to take into account a delay from pressing the photographing control by the user to exposing the picture by the electronic device. A first delay may be used to ensure that the N frames of images are the picture that the user wants to capture, thereby improving photographing experience of the user.

In a possible implementation, the obtaining a jitter amount of the first image is specifically performed as follows: obtaining gyro data of M lines in the first image, where M is a positive integer, and M is less than or equal to a quantity of pixel lines of the first image; and determining the jitter amount of the first image based on the gyro data of the M lines. In this way, the electronic device can calculate a jitter amount of a frame of image in the sensor, and an image with better quality can be selected, for processing by the electronic device, from a plurality of frames of images only when jitter amounts of the plurality of frames of images are calculated, so that an image seen by a user can be clearer.

In a possible implementation, the obtaining gyro data of M lines in the first image is specifically performed as follows:
  obtaining exposure time information of the M lines in the first image, where the exposure time information includes start moments and end moments of exposure of the M lines;
  obtaining timestamp information and corresponding gyro data, where the timestamp information is information about time of collecting the corresponding gyro data; and
  when the timestamp information is in exposure time information of a corresponding line in the M lines, obtaining gyro data in the exposure time information of the corresponding line.

In this way, the gyro data is selected based on the timestamp information and the exposure time information, which can ensure a shaking situation of a user when the first image is exposed, thereby ensuring accuracy of the gyro data in terms of time, and further ensuring accuracy of the obtained jitter amount.

In a possible implementation, the determining the jitter amount of the first image based on the gyro data of the M lines is specifically performed as follows:
  representing gyro data of an ith line in the M lines by using a jitter function $F_i$:

$$F_i = [g_{i1}, g_{i2}, \ldots, g_{in}, \ldots, g_{ij}]$$

where j indicates that exposure of the ith line has gyro data corresponding to a total of j pieces of timestamp information;
  integrating Q dimensions of gyro data corresponding to an nth piece of timestamp information in the j pieces of timestamp information of each of the M lines, to obtain a spatial location $p_{i\,n}$ corresponding to the nth piece of timestamp information of the ith line:

$$p_{in} = f * \sum_{1}^{Q} g_{ink} \cdot \Delta t_{in}$$

where f is a focal length, k is an integer from 1 to Q, $g_{i\,n\,k}$ is data of a kth dimension in the gyro data in the nth piece of timestamp information of the ith line, and $\Delta t_{i\,n}$ is a time difference between the nth piece of timestamp information and a previous piece of timestamp information of the ith line;
  determining a location function $p_i$ of the ith line based on the spatial location corresponding to each piece of timestamp information of the ith line:

$$p_i = [0, p_{i1}, p_{i2}, \ldots, p_{ij}]$$

where $p_{i\,j}$ represents the spatial location of the gyro data $g_{i\,j}$ corresponding to the jth piece of timestamp information of the ith line;
  determining the jitter amount $S_i$ of the ith line as a difference between a maximum value and a minimum value in the location function $p_i$ of the ith line:

$$S_i = \max(pi) - \min(pi)$$

where max(pi) is a maximum value in j location functions of the ith line, and min(pi) is a minimum value in the j location functions of the ith line; and
  determining the jitter amount S of the first image as an average value of jitter amounts of the M lines:

$$S = \frac{1}{M} \sum_{1}^{M} S_i.$$

In this way, the electronic device can efficiently calculate the jitter amount of each frame of image, to prepare for subsequent identification and selection, thereby ensuring integrity and reliability of the solution.

In a possible implementation, the electronic device further performs the following operation:
  obtaining an optical compensation amount corresponding to each piece of timestamp information of the ith line.

The determining a location function $p_i$ of the ith line based on the spatial location corresponding to each piece of timestamp information of the ith line is further performed as follows:
  determining, based on the spatial location and the optical compensation amount that correspond to each piece of timestamp information of the ith line, that the location function $p_i$ of the ith line is:

$$p_i = [0, p_{i1} - o_{i1}, p_{i2} - o_{i2}, \ldots, p_{ij} - o_{ij}]$$

where $o_{i\,j}$ is the optical compensation amount corresponding to the jth piece of timestamp information of the ith line.

In this way, in a process of obtaining a jitter amount, the electronic device having an optical compensation capability takes the optical compensation amount into account in advance and processes the optical compensation amount in advance, to ensure accuracy of an obtained jitter amount of a frame of image.

In a possible implementation, the preset threshold ranges from 0.1 pixels to 1.0 pixel. In this way, the preset threshold can be used to effectively select the current first image. When the jitter amount is small, it indicates that the frame of image has a low jitter degree, and jitter of the electronic device cannot cause blurring of the frame of image. Therefore, the frame of image can be output from the sensor for subsequent processing, thereby ensuring sharpness and quality of the image.

According to a third aspect, this application provides an electronic device, including a touchscreen, one or more processors, and one or more memories. The one or more processors are coupled to the touchscreen, a camera, and the one or more memories. The one or more memories are configured to store computer program code, and the computer program code includes computer instructions. When the one or more processors execute the computer instructions, the electronic device is enabled to perform the photographing method in any possible implementation of any one of the foregoing aspects.

According to a fourth aspect, this application provides an electronic device, including one or more functional modules. The one or more functional modules are configured to perform the photographing method in any possible implementation of any one of the foregoing aspects.

According to a fifth aspect, an embodiment of this application provides a computer storage medium, including computer instructions. When the computer instructions are run on an electronic device, the electronic device is enabled to perform the photographing method in any possible implementation of any one of the foregoing aspects.

According to a sixth aspect, an embodiment of this application provides a computer program product. When the computer program product is run on a computer, the computer is enabled to perform the photographing method in any possible implementation of any one of the foregoing aspects.

DESCRIPTION OF EMBODIMENTS

Figure 1:
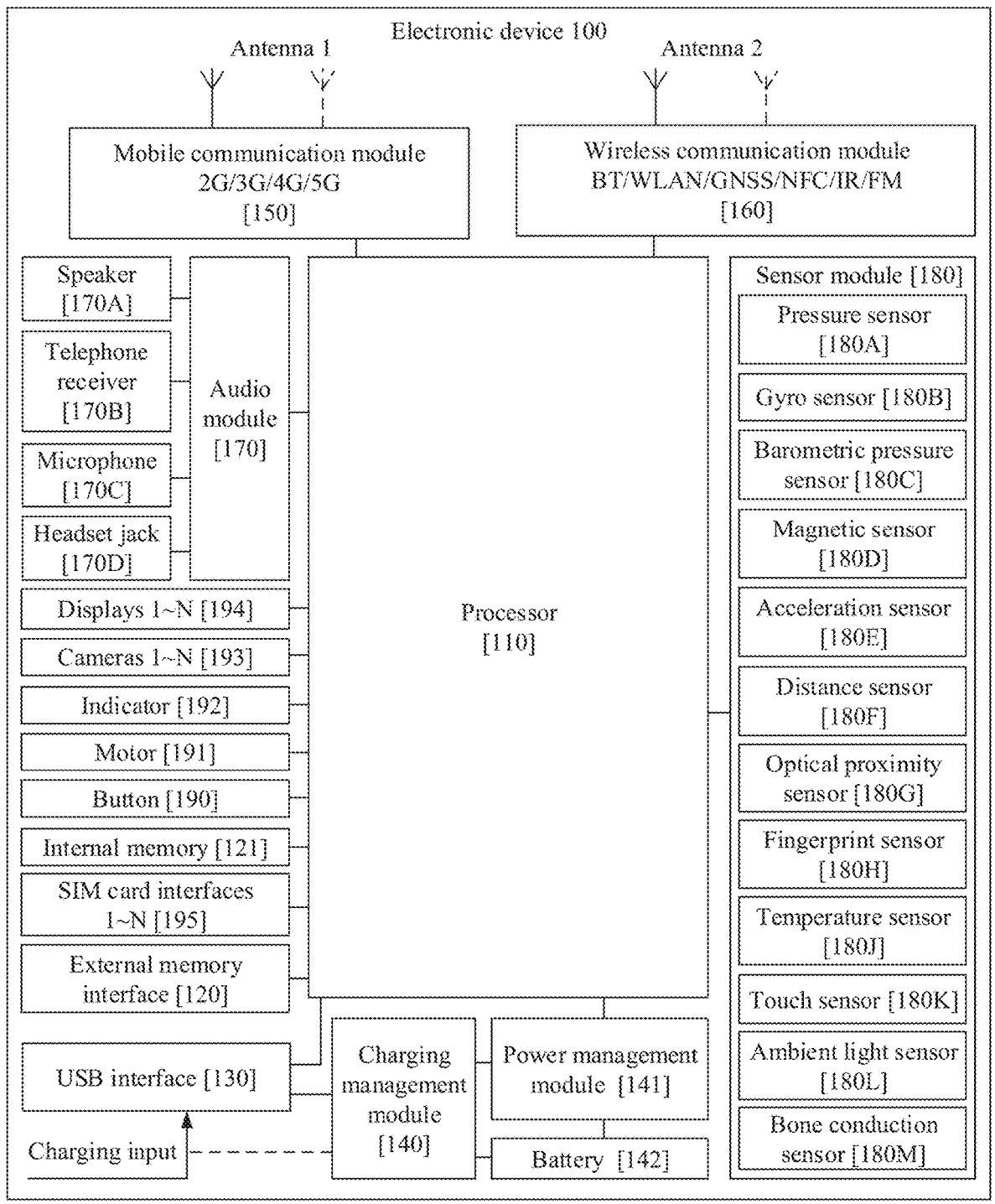
FIG. 1 is a schematic diagram of a hardware structure of an electronic device 100 according to an embodiment of this application.

The following clearly describes the technical solutions in the embodiments of this application with reference to the accompanying drawings. In descriptions of the embodiments of this application, unless otherwise stated, "/" indicates a meaning of "or", for example, A/B may indicate A or B. "And/or" in the specification is merely used to describe an association relationship between associated objects, and indicates that three relationships may exist. For example, A and/or B may indicate that there are three cases: Only A exists, both A and B exist, and only B exists. In addition, in the descriptions of the embodiments of this application, "a plurality of" means two or more.

The following terms "first" and "second" are merely intended for descriptive purposes, and shall not be understood as an indication or implication of relative importance or an implicit indication of a quantity of indicated technical features. Therefore, features defined with "first" and "second" may explicitly or implicitly include one or more features. In the descriptions of the embodiments of this application, unless otherwise stated, "a plurality of" means two or more.

The following describes related technologies in the embodiments of this application.

(1) A Photographing Process of an Electronic Device

When an electronic device has a photographing function, a photographing process of the electronic device is as follows: A user presses a control used for photographing, and the electronic device opens an aperture and a shutter in response to the user operation. Light enters a camera from a lens and reaches a sensor, and the sensor is responsible for collecting and recording the light, converting the light into a current signal, and sending the current signal to image signal processing (ISP) for processing. Finally, a processed image is sent to a processor of the electronic device for storage.

The ISP is configured to perform operation processing on a signal output by the sensor, that is, perform linear correction, noise point removal, defective pixel repair, color difference, white balance correction, exposure correction, or other processing on an image collected by the sensor, thereby greatly improving sharpness and imaging quality of a processed image.

In the photographing process of the electronic device, photo sharpness varies with resolution. More pixels (minimum photosensitive units) in a photo in the sensor indicate a clearer image. Therefore, a higher pixel of the camera indicates higher sharpness of photographing and higher resolution of a captured photo.

(2) Shutter

The shutter is an apparatus that controls a length of time during which light enters a camera, to determine exposure time of an image. When the shutter remains in an open state for a longer time, more light enters the camera, and the exposure time of the image is longer. When the shutter remains in the open state for a shorter time, less light enters the camera, and the exposure time of the image is shorter. A shutter speed is time during which the shutter remains in the open state. The shutter speed is a time interval from the open state to a closed state of the shutter. During this period of time, an object may leave an image on a film. A higher shutter speed indicates a clearer image presented by a moving object on an image sensor. On the contrary, a lower shutter speed indicates a more blurry image presented by the moving object.

Shutters may be classified into a rolling shutter and a global shutter. The global shutter means that an entire scene is exposed at the same time, and the rolling shutter means that the sensor implements exposure line by line.

The rolling shutter is a shutter that is opened and closed like a curtain. To be specific, when exposure starts, the sensor starts exposure line by line until all pixels are exposed, and exposure of all the lines is completed in an extremely short time.

A rolling shutter effect often occurs during exposure by the rolling shutter. The rolling shutter effect means that phenomena, such as partial exposure, a slope pattern, or shaking, occur when exposure is improper or an object moves relatively fast. A more severe rolling shutter effect indicates a more blurry photographed image.

Photographing parameters may include parameters such as a shutter, exposure time, an aperture value, an exposure value, and an ISO. The electronic device may implement auto focus (AF), automatic exposure (AE), auto white balance (AWB), and 3A (AF, AE, and AWB) by using an algorithm to automatically adjust these photographing parameters.

(3) Gyro Sensor (Gyrometer)

A gyro is an angular movement detection apparatus that uses a momentum sensitive housing of a high-speed rotatory body to rotate around one or two axes orthogonal to an axis of rotation relative to inertial space. An angular movement detection apparatus that is manufactured by using another principle and that has a similar function may also be referred to as a gyro. To be specific, the gyro can measure an amplitude of angular rotation of an object in space.

(4) OIS

The OIS technology improves performance of a camera assembly by canceling image blurring caused by instability or jitter of a camera and/or compensating for rolling shutter distortion during image capturing. The OIS technology can compensate for impact of camera movement to a large extent, including rotation, translation, a shutter effect, and the like.

For example, the electronic device runs to the left during photographing, for example, by 2 cm. The OIS technology can compensate for 0.5 cm to the right, to reduce a degree of blurring caused by movement of the electronic device.

The following describes an apparatus in the embodiments of this application.

FIG. 1 is a schematic diagram of a hardware structure of an electronic device 100 according to an embodiment of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present disclosure does not constitute a specific limitation on the electronic device 100. In some other embodiments of this application, the electronic device 100 may include more or fewer components than those shown in the figure, or combine some components, or split some components, or have different component arrangements. The illustrated components may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components or may be integrated into one or more processors.

The controller may be a nerve center and command center of the electronic device 100. The controller may generate an operation control signal based on instruction operation code and a sequence signal, to complete control of instruction fetching and instruction execution.

A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving efficiency of a system.

In some embodiments, the processor 110 may include one or more interfaces. The USB interface 130 is an interface that complies with USB standard specifications, and may be specifically a Mini USB interface, a Micro USB interface, a USB Type C interface, or the like. The USB interface 130 may be configured to connect to a charger to charge the electronic device 100, may be configured to transmit data between the electronic device 100 and a peripheral device, or may be configured to connect to a headset to play audio through the headset. The interface may be further configured to connect to another electronic device 100, for example, an AR device.

The charging management module 140 is configured to receive a charging input from a charger. When charging the battery 142, the charging management module 140 may further supply power to the electronic device 100 by using the power management module 141.

The power management module 141 is configured to connect to the battery 142, the charging management module 140, and the processor 110. The power management module 141 receives an input from the battery 142 and/or an input from the charging management module 140, and supplies power to the processor 110, the internal memory 121, an external memory, the display 194, the camera 193, the wireless communication module 160, and the like.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed to increase antenna utilization.

The mobile communication module 150 may provide a solution for wireless communication including 2G/3G/4G/5G and the like applied to the electronic device 100. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and send the processed electromagnetic wave to the modem processor for demodulation. The mobile communication module 150 may further amplify a signal modulated by the modem processor, and convert the signal into an electromagnetic wave through the antenna 1 for radiation.

The modem processor may include a modulator and a demodulator. The modulator is configured to modulate a low-frequency baseband signal to be sent into a medium or high frequency signal. The demodulator is configured to demodulate a received electromagnetic wave signal into a low-frequency baseband signal. Then, the demodulator transfers, to the baseband processor for processing, the low-frequency baseband signal obtained through demodulation. The low-frequency baseband signal is processed by the baseband processor and then transferred to the application processor. The application processor outputs a sound signal by using an audio device (which is not limited to the speaker 170A, the telephone receiver 170B, and the like), or displays an image or a video by using the display 194.

The wireless communication module 160 may provide a solution for wireless communication including a wireless local area network (WLAN) (such as a wireless fidelity (Wi-Fi) network), Bluetooth (BT), a global navigation satellite system (GNSS), frequency modulation (FM), a near field communication (NFC) technology, an infrared (IR) technology, and the like applied to the electronic device 100. The wireless communication module 160 may be one or more components integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave through the antenna 2 for radiation.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology.

The electronic device 100 implements a display function by using the GPU, the display 194, the application processor, and the like. The GPU is a microprocessor for image processing and is connected to the display 194 and the application processor. The GPU is configured to perform mathematical and geometric calculation, and is configured to render graphics. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode or an active-matrix organic light emitting diode (AMOLED), a flexible light-emitting diode (FLED), a Mini LED, a Micro LED, a Micro-OLED, a quantum dot light emitting diode (QLED), or the like. In some embodiments, the electronic device 100 may include one or N displays 194, where N is a positive integer greater than 1.

The electronic device 100 may implement an obtaining function by using the ISP, the camera 193, the video codec, the GPU, the display 194, the application processor, and the like.

The ISP is configured to process data fed back by the camera 193. For example, during photographing, a shutter is opened, and light is transferred to a photosensitive element of the camera through a lens. An optical signal is converted into an electrical signal. The photosensitive element of the camera transfers the electrical signal to the ISP for processing, to convert the electrical signal into an image or a video visible to naked eyes. In some embodiments, the ISP may be disposed in the camera 193.

The camera 193 is configured to capture a still image or a video. An optical image is generated for an object by using the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transfers the electrical signal to the ISP to convert the electrical signal into a digital image or a video signal. The ISP outputs the digital image or the video signal to the DSP for processing. The DSP converts the digital image or the video signal into an image or a video signal in a standard format, for example, RGB or YUV. In some embodiments, the electronic device 100 may include one or N cameras 193, where N is a positive integer greater than 1. For example, in some embodiments, the electronic device 100 may obtain images of a plurality of exposure coefficients by using the N cameras 193. Further, during video post-processing, the electronic device 100 may composite an HDR image based on the images of the plurality of exposure coefficients by using an HDR technology.

The digital signal processor is configured to process a digital signal. In addition to processing a digital image or a video signal, the digital signal processor can further process another digital signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of coding formats, such as moving picture experts group (MPEG)1, MPEG2, MPEG3, and MPEG4.

The external memory interface 120 may be configured to connect to an external storage card, for example, a Micro SD card, to expand a storage capacity of the electronic device 100. The external storage card communicates with the processor 110 through the external memory interface 120, to implement a data storage function, for example, files such as a video are stored in the external storage card.

The internal memory 121 may be configured to store computer executable program code, and the executable program code includes instructions. The processor 110 executes various function applications and data processing of the electronic device 100 by running the instructions stored in the internal memory 121. The internal memory 121 may include a program storage area and a data storage area. The program storage area may store an operating system, an application required by at least one function (for example, a sound playing function or an image/video playing function), and the like. The data storage area may store data (for example, audio data and a phone book) and the like that are created during use of the electronic device 100.

The sensor module 180 may include one or more sensors, and these sensors may be of a same type or different types. It may be understood that the sensor module 180 shown in FIG. 1 is merely an example division manner, and there may be another division manner. This is not limited in this application.

The gyro sensor 180B may be configured to determine a moving posture of the electronic device 100. In some embodiments, angular velocities of the electronic device 100 around three axes (that is, an x axis, a y axis, and a z axis) may be determined by using the gyro sensor 180B. The gyro sensor 180B may be used for image stabilization during photographing.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D may include a Hall effect sensor. The electronic device 100 may detect opening and closing of a flip leather case by using the magnetic sensor 180D.

The acceleration sensor 180E may detect accelerations of the electronic device 100 in all directions (usually in three axes), and may detect magnitude and a direction of gravity when the electronic device 100 is still. The acceleration sensor 180E may be further configured to recognize a posture of the electronic device 100, and is applied to switching between a landscape mode and a portrait mode, a pedometer, or another application.

The touch sensor 180K is also referred to as a "touch panel". The touch sensor 180K may be disposed on the display 194. The touch sensor 180K and the display 194 form a touchscreen, which is also referred to as a "touch screen". The touch sensor 180K is configured to detect a touch operation performed on or near the touch sensor 180K. The touch sensor can transfer the detected touch operation to the application processor to determine a type of a touch event. A visual output related to the touch operation may be provided by using the display 194. In some other embodiments, the touch sensor 180K may be alternatively disposed on a surface of the electronic device 100 at a location different from that of the display 194.

The button 190 includes a power on/off button, a volume button, and the like. The button 190 may be a mechanical button, or may be a touch button. The electronic device 100 may receive a key input and generate a key signal input related to user settings and function control of the electronic device 100.

Figure 2:
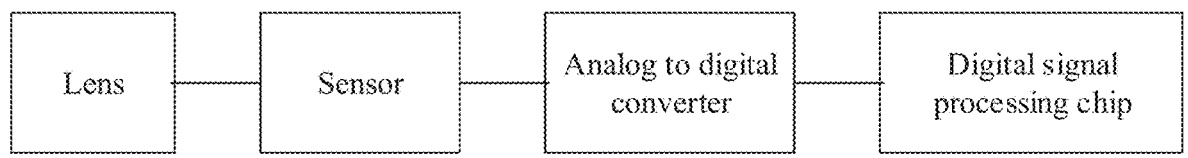
FIG. 2 is a schematic diagram of a structure of a camera according to an embodiment of this application.

FIG. 2 is a schematic diagram of a structure of a camera disclosed in this application. As shown in FIG. 2, a camera of an electronic device may include a lens, a sensor, an analog to digital converter (ADC), and a digital signal processing (DSP) chip. Light may be projected through the lens onto a surface of the sensor. Then, the ADC may convert pixels on the sensor into electrical signals, which are converted into digital image signals through the ADC. Afterwards, the DSP may process an image by using an ISP algorithm and then transmit a processed image to a processor of a mobile phone through an IO interface for post-processing.

During actual photographing by a user, sharpness of an image is poor due to reasons such as natural shaking of a human hand, movement of the user, rapid movement of a photographed object, and a focusing location of AF.

To present a clear image to the user and reduce a blurring degree of the image, the electronic device may perform jitter correction or compensation on a raw image captured by the sensor, or may perform ISP tuningand a post algorithm on the raw image, for example, perform deblurring processing on the raw image. However, all the foregoing images are obtained by processing a captured raw image (image obtained from the sensor), and final imaging quality of the image also depends on sharpness of the raw image obtained from the sensor. When the image obtained from the sensor is more blurry, a rolling shutter effect is more obvious, it is more difficult to process the raw image later, and a processing effect is limited. Consequently, sharpness of the captured image is poor, and photographing experience of a user is poor.

In this embodiment of this application, the electronic device may obtain current N frames of images and jitter amounts of the N frames of images when the camera is performing photographing. When a jitter amount of one frame of image in the current N frames is less than (less than or equal to) a preset threshold, the electronic device may determine the frame of image as a raw image output by the sensor. When the jitter amount of the frame of image is greater than or equal to (greater than) the preset threshold, the electronic device obtains a jitter amount of a next frame of image and also performs the foregoing comparison. When the jitter amounts of all the N frames of images are greater than or equal to (greater than) the preset threshold, the electronic device may determine a frame of image with a minimum jitter amount in the N frames of images as the output raw image. The jitter amount of the image indicates a jitter degree of the image. A larger jitter amount of the image indicates a more intense jitter degree and a more severe blurring degree of the image. N is a positive integer, and the N frames of images may be images presented on the sensor after continuous exposure of the camera of the electronic device. The output raw image refers to an image obtained by the sensor and not processed by the electronic device. In the foregoing implementation, the N frames of images obtained by the electronic device are selected and identified, so that an image with a large jitter amount can be filtered out, thereby improving sharpness of the output raw image. Therefore, an image obtained after post-processing has higher sharpness and quality, so that sharpness of an image captured by the electronic device can be improved, thereby improving photographing experience of a user.

Figure 3:
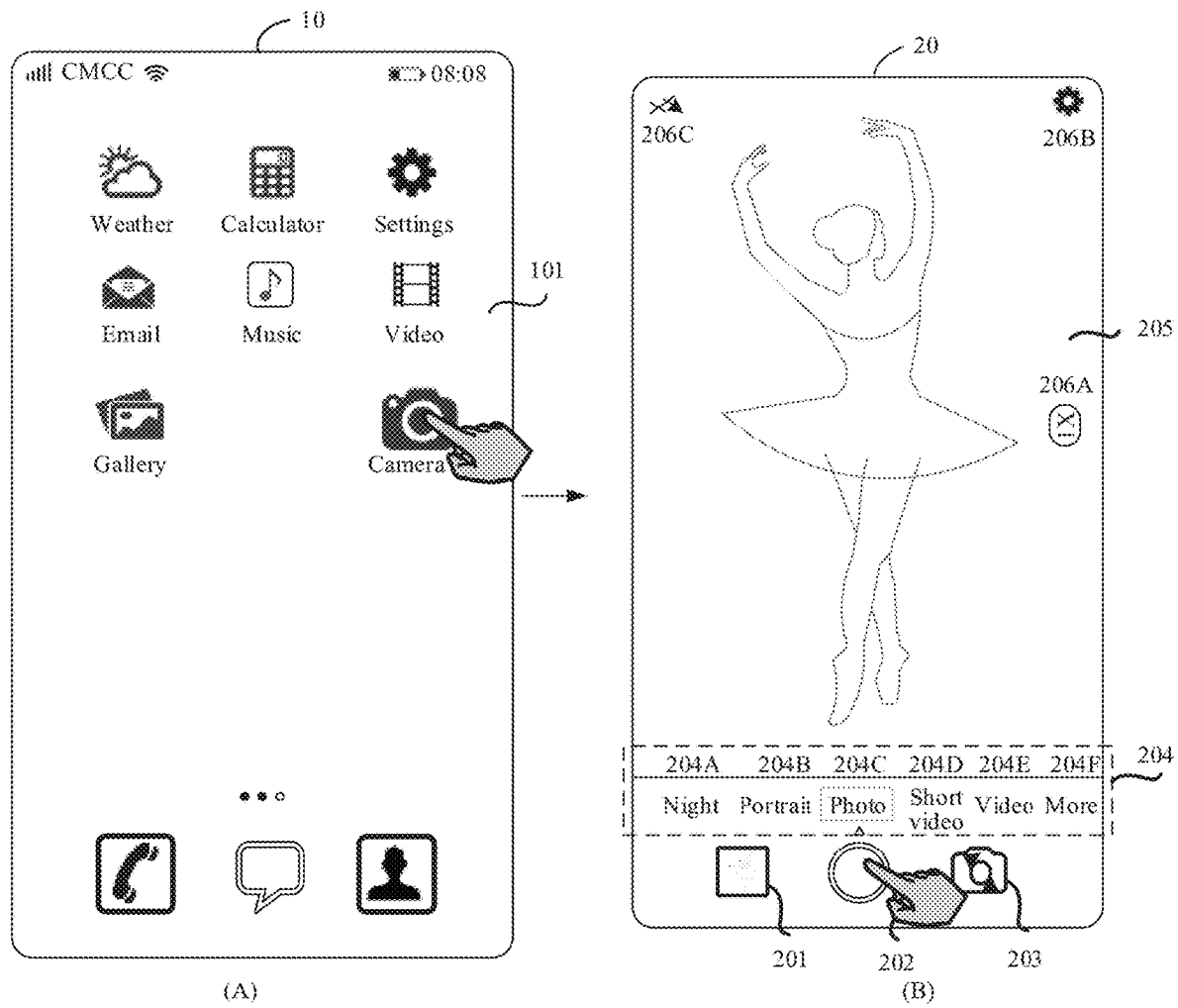
FIG. 3 is a schematic diagram of a group of preview interfaces according to an embodiment of this application.

FIG. 3 is a schematic diagram of a group of preview interfaces. As shown in (A) in FIG. 3, an electronic device may have a page 10 on which an application icon is placed. The page includes a plurality of application icons 101 (for example, a Weather application icon, a Calculator application icon, a Settings application icon, an Email application icon, a Music application icon, a Video application icon, a Gallery application icon, and a Camera application icon). A page indicator may be further displayed and included below the plurality of application icons, to indicate a location relationship between a currently displayed page and another page. A plurality of tray icons (for example, a Phone application icon, a Messages application icon, and a Contacts application icon) exist below the page indicator, and the tray icons remain displayed during page switching. In some embodiments, the page may alternatively include a plurality of application icons and a page indicator. The page indicator may not be a part of the page, and may exist separately. The picture icon is also optional. This is not limited in this embodiment of this application.

The electronic device may receive an input operation (for example, a tap) performed by a user on the Camera icon, and in response to the input operation, the electronic device may display a photographing interface 20 shown in (B) in FIG. 3.

As shown in (B) in FIG. 3, the photographing interface 20 may include an echo control 201, a photographing control 202, a camera switching control 203, an image (preview picture) 205 captured by a camera, a zoom ratio control 206A, a settings control 206B, a flash switch 206C, and one or more photographing mode controls 204 (for example, a "Night" control 204A, a "Portrait" control 204B, a "Photo" control 204C, a "Short video" control 204D, a "Video" control 204E, and a "More" control 204F). The echo control 201 may be configured to display a captured image. The photographing control 202 is configured to trigger storage of an image captured by the camera. The camera switching control 203 may be configured to switch a camera for photographing. The settings control 206B may be configured to set a photographing function. The zoom ratio control 206A may be configured to set a zoom ratio of the camera. The zoom ratio control 206A may trigger the electronic device to display a zoom slider bar, and the zoom slider bar may receive an operation that the user slides upwards (or downwards), so that the electronic device increases (or decreases) a zoom ratio of the camera. Possibly, the zoom ratio control 206A may include a zoom-in control and a zoom-out control displayed on the electronic device. The zoom-in control may be configured to: receive a user input, and trigger the electronic device to increase the zoom ratio of the camera in response to the user input. The zoom-out control may be configured to: receive a user input, and trigger the electronic device to decrease the zoom ratio of the camera in response to the user input. The flash switch 206C may be configured to turn on/off a flash. The photographing mode control may be configured to trigger start of an image processing procedure corresponding to the photographing mode. For example, the "Night" control 204A may be configured to trigger an increase in brightness and color richness in a captured image. The "Portrait" control 204B may be configured to trigger blurring of a background of a person in a captured image. As shown in (B) in FIG. 3, a photographing mode currently selected by the user is "Photo".

When the electronic device displays the preview picture 205, the electronic device has started continuous exposure to obtain an image in the current picture, and continuously displays the image obtained through exposure on a screen. As shown in (B) in FIG. 3, the preview picture 205 of the electronic device may display a posture of an actress that is dancing.

When the electronic device performs exposure, a shutter speed may be 1, ½, ¼, ⅛, 1/15, 1/30, 1/60, 1/125, 1/250, 1/500, 1/1000, 1/2000 (seconds), or the like.

When the user touches the photographing control 202, after obtaining the touch operation performed on the photographing control 202, the electronic device may obtain and store a captured image.

In this embodiment of this application, during exposure, the electronic device obtains a jitter amount of a raw image presented on a sensor. The following describes a process in which the electronic device obtains a jitter amount of an image by using data of a gyro sensor.

When performing photographing, the electronic device obtains gyro data of a gyro, and the gyro data corresponds to each frame of image. A jitter situation of the electronic device can be reflected by using the gyro data, so that a jitter degree of the electronic device, that is, a jitter amount corresponding to each frame of image, can be determined when each frame of image is captured.

In a first step, the electronic device obtains gyro data of each frame of image during photographing.

In this embodiment of this application, an exposure manner is mainly an exposure manner for a rolling shutter. During exposure by the rolling shutter, all pixels start to be exposed in a line sequence. Image information of these pixels is not at a same moment but in sequence.

Figure 4:
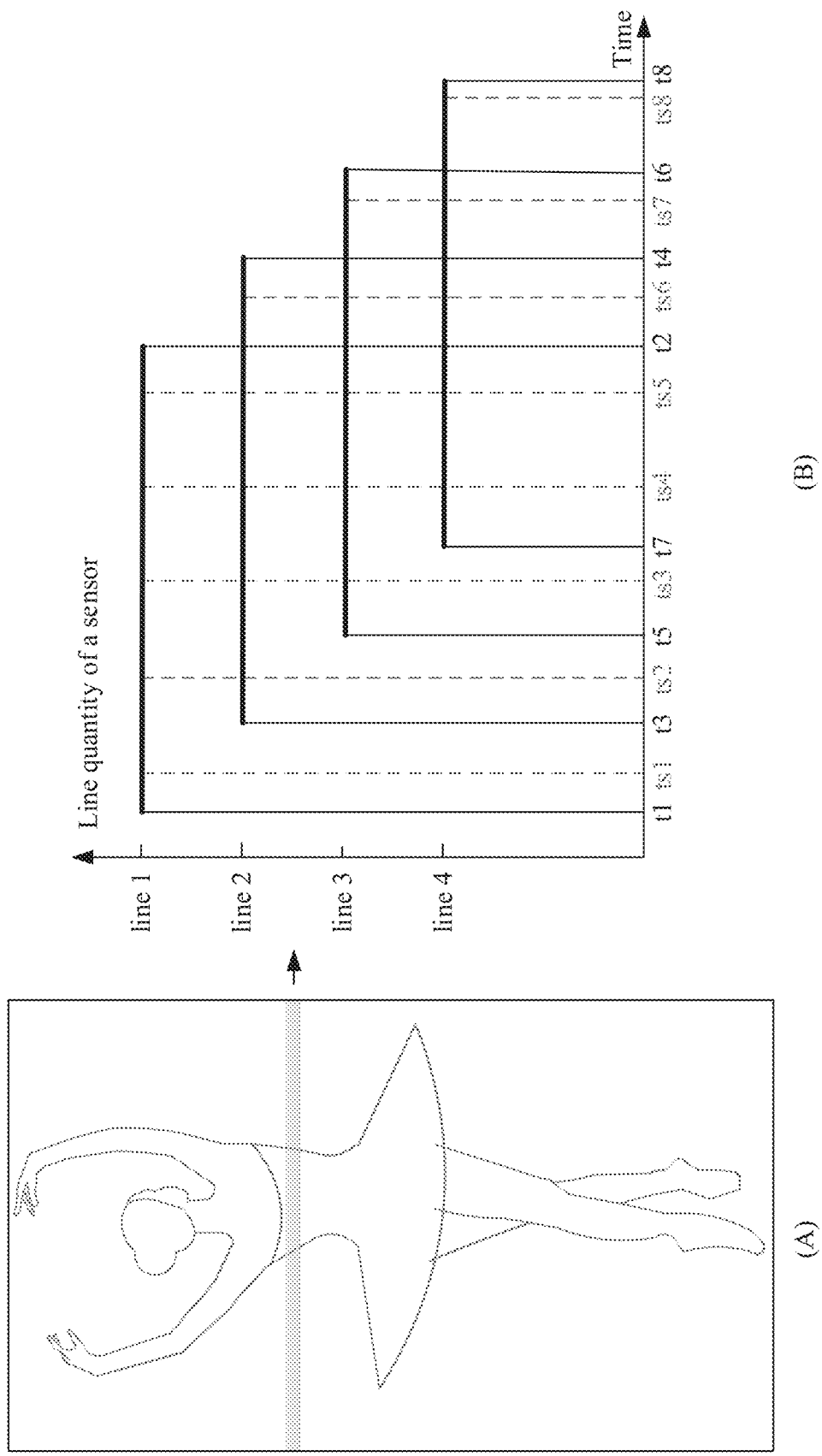
FIG. 4 is a schematic diagram of an image exposure process according to an embodiment of this application.

FIG. 4 is a schematic diagram of an image exposure process disclosed in an embodiment of this application. (A) in FIG. 4 shows an image frame corresponding to exposure, and it is assumed that a size of the image is 1920*1080. The electronic device may perform exposure in an exposure start sequence from top to down (or may be from bottom to up, which is not limited). An image shown in (B) in FIG. 4 represents an exposure process of a shaded portion in the frame of image, and the electronic device may record exposure time information of each line. The exposure time information may include a start moment and an end moment of exposure of a line, that is, a start time point and an end time point of exposure of a line in the image. Therefore, it can be learned that exposure duration of a line is a time length obtained by subtracting a start moment from an end moment of exposure of the line.

During photographing by a user, jitter of an image is overall jitter, that is, a jitter amplitude (or a jitter degree) of one or several lines in the image is consistent with a jitter amplitude of the entire image. Therefore, measurement of a jitter situation of a frame of image can be determined by a jitter situation of one or several lines in the frame of image. In this case, the electronic device may first obtain exposure time of one or several lines in an image, and obtain gyro data of the electronic device at the corresponding time based on the exposure time, so that gyro data of the image can be obtained.

To obtain exposure time information of one line of pixels or a plurality of lines of pixels in the frame of image, the electronic device may select exposure time information of M lines, where M is a positive integer, and M is less than or equal to a quantity of pixel lines of the frame of image (such as 1920). As shown in (B) in FIG. 4, the electronic device may select four (M) lines and obtain exposure time information of the four lines. A start moment of exposure of the first line (line 1) of pixels is t1, and an end moment is t2. A start moment of exposure of the second line (line 2) is t3, and an end moment is t4. A start moment of exposure of the third line (line 3) is t5, and an end moment is t6. A start moment of exposure of the fourth line (line 4) is t7, and an end moment is t8. Therefore, exposure duration of the first line is t2−t1, exposure duration of the second line is t4−t3, exposure duration of the third line is t6−t5, and exposure duration of the fourth line is t8−t7. It should be noted that the first line to the fourth line do not mean a sequence for exposing the entire frame of image, but a sequence of the M lines selected from the entire image. Time differences between exposure start moments of two adjacent lines are basically the same, which may be understood as that the electronic device starts exposure line by line in sequence.

When the electronic device performs exposure, a gyro obtains gyro data at a specific sampling frequency, that is, the electronic device can obtain timestamp information and the gyro data. As shown in (B) in FIG. 4, the timestamp information represents information about a moment of obtaining the gyro data, and the timestamp information is in a one-to-one correspondence with the gyro data. For example, when the timestamp information is a moment ts1, the gyro data is g1; when the timestamp information is a moment ts2, the gyro data is g2; when the timestamp information is a moment ts3, the gyro data is g3 . . . . Time intervals between two adjacent pieces of timestamp information are the same, and the time interval is a reciprocal for the sampling frequency, for example, ¹⁄₁₀₀₀ s. Due to different electronic devices, sampling frequencies of the gyro may be different. This is not limited in this embodiment of this application.

It should be noted that in this embodiment of this application, the gyro data may be data related to an x axis, a y axis, and a z axis, may include data such as a velocity and an acceleration, or may include posture change data and the like. This is not specially limited in this embodiment of this application. For example, g1 may include a rotation angle of the x axis, a rotation angle of the y axis, and rotation angle data of the z axis. Correspondingly, the gyro data is three-dimensional data.

In this case, the electronic device knows the exposure time information of the M lines, and the timestamp information and the gyro data that are of the gyro. The electronic device may obtain, based on exposure time of each line, gyro data at a corresponding timestamp during exposure of the M lines, thereby obtaining gyro data of the (frame of) image.

For example, as shown in (B) in FIG. 4, it is known that the first line (line 1) has the exposure start moment t1 and the exposure end moment t2. Timestamp information falling within a time period from t1 to t2 includes ts1 to ts5. Therefore, the electronic device may determine that gyro data corresponding to exposure of the first line is g1, g2, g3, g4, and g5. During exposure of the second line (line 2), timestamp information falling within a time period from t3 to t4 includes ts2 to ts6, and the electronic device may determine that gyro data corresponding to exposure of the second line is g2 to g6. During exposure of the third line (line 3), timestamp information falling within a time period from t5 to t6 includes ts3 to ts7, and the electronic device may determine that gyro data corresponding to exposure of the third line is g3 to g7 . . . . Therefore, the gyro data corresponding to exposure of the M lines in the frame of image may be determined.

For example, it is known that the obtained timestamp information ts1 to ts8 respectively correspond to the gyro data g1, g2, g3, g4, g5, g6, g7, and g8 in sequence. The electronic device may obtain exposure time information of all lines in a frame of image, and determine ranges, of exposure time information of specific lines, within which the known timestamp information falls. It is assumed that ts1 to ts5 fall within a range of exposure time t1 to t2 of the first line, ts2 to ts6 fall within a range of exposure time t3 to t4 of the second line, ts3 to ts7 fall within a range of exposure time t5 to 16 of the third line, and ts4 to ts8 fall within a range of exposure time t7 to 18 of the fourth line. In this way, gyro data of exposure of a corresponding line can be determined, to be specific, the gyro data corresponding to exposure of the first line is g1 to g5, the gyro data corresponding to exposure of the second line is g2 to g6, the gyro data corresponding to exposure of the third line is g3 to g7, and the gyro data corresponding to exposure of the fourth line is g4 to g8.

It should be further noted that in the foregoing implementation, the timestamp information and the gyro data that are of the gyro may be first obtained, and then exposure time information of an image may be obtained; or exposure time information of an image may be first obtained, and then the timestamp information and the gyro data that are of the gyro may be obtained. An obtaining sequence is not limited.

In a second step, the electronic device calculates a jitter amount of each frame of image based on the gyro data.

After obtaining the gyro data of each of the M lines, the electronic device may calculate a jitter amount of each line, which is specifically described below.

Because the gyro data is measured from a large quantity of angles, manners of representing the gyro data and the corresponding timestamp information are first described herein. The gyro data needs to be specifically determined by using three angles: i, n, and k.

In the three angles, i represents exposure of an ith line (i is a positive integer from 1 to M), $g_i$ represents all gyro data of the ith line, and $ts_i$ represents all timestamp information of the ith line. For example, in content shown in (B) in FIG. 4, it is assumed that gyro data of a total of four (M) lines is obtained, so that it can be determined that M is equal to 4 and a range of i is 1, 2, 3, and 4.

In the three angles, n represents a sequence of an nth piece of timestamp information of exposure of a line (n is a positive integer from 1 to j), and may be understood as the nth column. This line has a total of j pieces of timestamp information. For example, $g_{i\,n}$ represents gyro data corresponding to the nth piece of timestamp information of exposure of the ith line, $ts_{i\,n}$ represents the nth piece of timestamp information of exposure of the ith line, and $g_{i\,n}$ corresponds to $ts_{i\,n}$, where j is a positive integer.

In the three angles, k represents a kth dimension of the gyro data (k is a positive integer from 1 to Q). It is assumed that the gyro data corresponding to each piece of timestamp information of the electronic device has Q dimensions, which may be understood as that each column in each line includes a group of gyro data and each group of gyro data has Q dimensions. In this case, $g_{i\,n\,k}$ is the gyro data of the kth dimension corresponding to the nth piece of timestamp information of the ith line, where Q is a positive integer. For example, the gyro data includes data of the x axis and the y axis, Q is equal to 2, and a range of k is 1 and 2.

In exposure of M lines of pixels, the gyro data of the ith line may be represented by using a jitter function, that is, $$F_i = [g_{i1}, g_{i2}, \ldots, g_{in}, \ldots, g_{ij}]$$

where j indicates that exposure of the ith line has gyro data corresponding to a total of j pieces of timestamp information. For example, in the description corresponding to FIG. 4, $F_1=[g_{1\,1}, g_{1\,2}, g_{1\,3}, g_{1\,4}, g_{1\,5}]$ of the first line corresponds to [g1, g2, g3, g4, g5] in (B) in FIG. 4, and $F_2=[g_{2\,1}, g_{2\,2}, g_{2\,3}, g_{2\,4}, g_{2\,5}]$ of the second line corresponds to [g2, g3, g4, g5, g6] in (B) in FIG. 4 . . . . In addition, values of j of lines may not necessarily be equal.

After obtaining the jitter function of the ith line, the jitter amount of the ith line may be determined based on the jitter function.

In a possible case, the electronic device may first integrate each group of gyro data in the jitter function of the ith line to determine a spatial location or posture $p_{i\,n}$ of the electronic device at each timestamp. The spatial location or posture $p_{i\,n}$ that is of the electronic device and that corresponds to each piece of timestamp information may be represented by using a location function $p_i$. The electronic device may learn, based on the jitter function, that the location function of the ith line is $p_i$, which may be expressed as:

$$p_i = [0, p_{i1}, p_{i2}, \ldots, p_{ij}]$$

where $p_{i\ 1}$ represents a spatial location of gyro data $g_{i\ 1}$ corresponding to the first piece of timestamp information of the ith line, ... ; and $p_{i\ j}$ represents a spatial location of gyro data $g_{i\ j}$ corresponding to the jth piece of timestamp information of the ith line.

Before obtaining the location function of the ith line, the electronic device needs to obtain a spatial location corresponding to each piece of gyro data of the ith line, which is specifically described below.

Assuming that the gyro data is Q dimensions of data, the electronic device may be based on the Q dimensions of gyro data. The electronic device may integrate the Q dimensions of gyro data to obtain a spatial location $p_{i\ n}$ corresponding to the nth piece of timestamp information:

$$p_{in} = f * \sum_{1}^{Q} g_{ink} \cdot \Delta t_{in}$$

where f represents a focal length, and f may be used as a coefficient for cumulative summation and may be obtained from the camera in advance; k is a positive integer from 1 to Q; and $g_{i\ n\ k}$ is data of the kth dimension in the gyro data in the nth piece of timestamp information of the ith line, for example, $g_{i\ n}$ includes $g_{i\ n\ 1}$, $g_{i\ n\ 2}$, $g_{i\ n\ 3}$, ..., and $g_{i\ n\ Q}$. $\Delta t_{i\ n}$ is a time difference between the nth piece of timestamp information and a previous (n−1)th piece of timestamp information of the ith line, that is, $\Delta t_{i\ n} = ts_{i\ n} - ts_{i\ n-1}$. For example, as shown in (B) in FIG. 4, the timestamp information corresponding to the gyro data of the first line is ts1, ts4, ts3, ts4, and ts5. For the first line, $\Delta t_{1\_2} = ts2 - ts1$, $\Delta t_{1\_3} = ts3 - ts2$, and $\Delta t_{1\_4} = ts4 - ts3$. It should be further noted that $\Delta t$ (including $\Delta t_{1\_2}$, $\Delta t_{1\_3}$, and the like) may be a specific time length, that is, a length of a time periodicity in which a gyro sensor collects data, that is, a reciprocal for a sampling frequency of the gyro sensor.

After obtaining the location function $p_i$ of the ith line, the electronic device may determine the jitter amount $S_i$ of the ith line.

The jitter amount $S_i$ is a difference between a maximum value and a minimum value in j spatial locations of the ith line, and $S_i$ may be expressed as:

$$S_i = \max(pi) - \min(pi)$$

where max(pi) is a maximum value in j location functions of the ith line, that is, max (0, $p_{i\ 1}$, $p_{i\ 2}$, ..., $p_{i\ j}$); and min(pi) is a minimum value in the j location functions of the ith line, that is, min (0, $p_{i\ 1}$, $p_{i\ 2}$, ..., $p_{i\ j}$).

Figure 5:
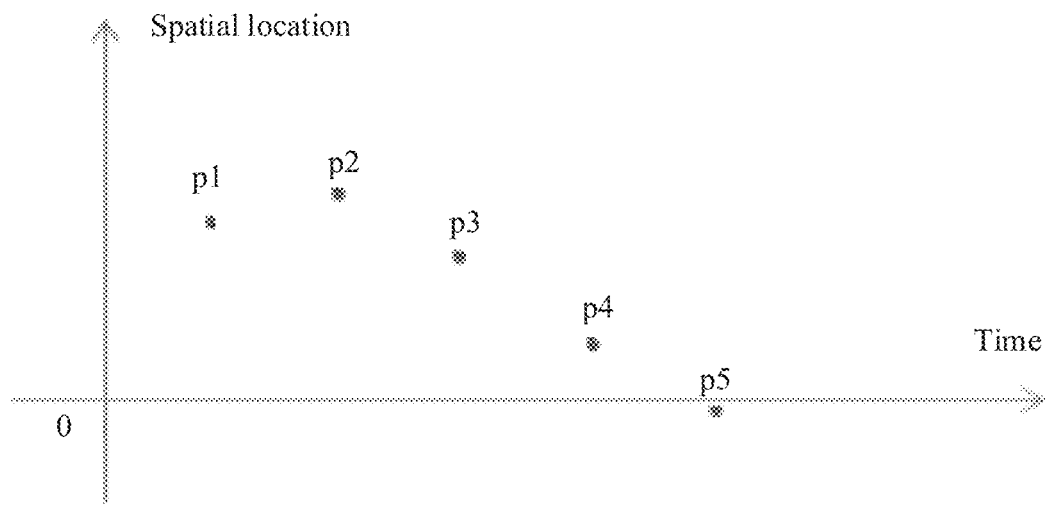
FIG. 5 is a schematic diagram of location function distribution according to an embodiment of this application.
Figure 5:
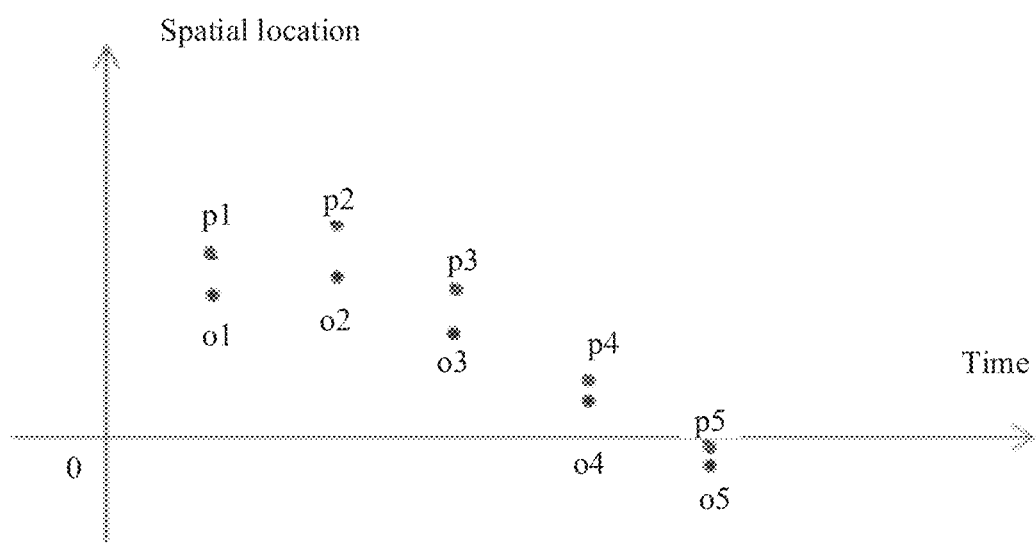

For example, FIG. 5 is a schematic diagram of location function distribution disclosed in an embodiment of this application. A vertical coordinate in FIG. 5 may represent a value of a spatial location of each line in a location function, and a horizontal coordinate may represent corresponding time (that is, the timestamp information). As shown in (A) in FIG. 5, in [0, $p_{i\ 1}$, $p_{i\ 2}$, ..., $p_{i\ j}$]=[0, p1, p2, p3, p4, p5], max(pi)=p2, min(pi)=p5, and $S_i$=p2−p5. The electronic device may calculate the jitter amount $S_i$ of each of the M lines.

In another possible case, when the electronic device has an optical image stabilization (OIS) function, the electronic device may sample an optical compensation amount o to obtain an optical compensation amount corresponding to each piece of timestamp information of the ith line, and the electronic device obtain the location function $p_i$ of the ith line based on the spatial location and the optical compensation amount that correspond to each piece of timestamp information, which may be expressed as:

$$p_i = [0, p_{i1} - o_{i1}, p_{i2} - o_{i2}, \ldots, p_{ij} - o_{ij}]$$

Descriptions of $p_{i\ 1}$ ..., and $p_{i\ j}$ are the same as the foregoing, and details are not described again. $o_{i\ 1}$ is the optical compensation amount corresponding to the first piece of timestamp information of the ith line, ..., and $o_{i\ j}$ is the optical compensation amount corresponding to the jth piece of timestamp information of the ith line.

After obtaining the location function $p_i$ of the ith line, the electronic device may determine the jitter amount $S_i$ of the ith line based on the location function. A method for calculating the jitter amount $S_i$ is consistent with the foregoing manner, and details are not described again.

For example, as shown in (B) in FIG. 5, in $p_i$=[0, $p_{i\ 1} - o_{i\ 1}$, $p_{i\ 2} - o_{i\ 2}$, ..., $p_{i\ j} - o_{i\ j}$]=[0, p1−o1, p2−o2, p3−o3, p4−o4, p5−o5], max(pi)=p2−o2 and min(pi)=0. In this case, it may be determined that $S_i$=p2−o2−0. According to the foregoing method, the electronic device may calculate the jitter amount $S_i$ of each of the M lines.

After obtaining the jitter amounts of the first line to the Mth line, the electronic device may obtain the jitter amount S of the frame of image, where S may be an average value of the jitter amounts of all of the M lines and may be expressed as:

$$S = \frac{1}{M} \sum_{1}^{M} S_i$$

So far, the electronic device can calculate a jitter amount of a frame of image in the sensor, and an image with better quality can be selected, for processing by the electronic device, from a plurality of frames of images only when jitter amounts of the plurality of frames of images are calculated, so that an image seen by a user can be clearer.

Figure 6:
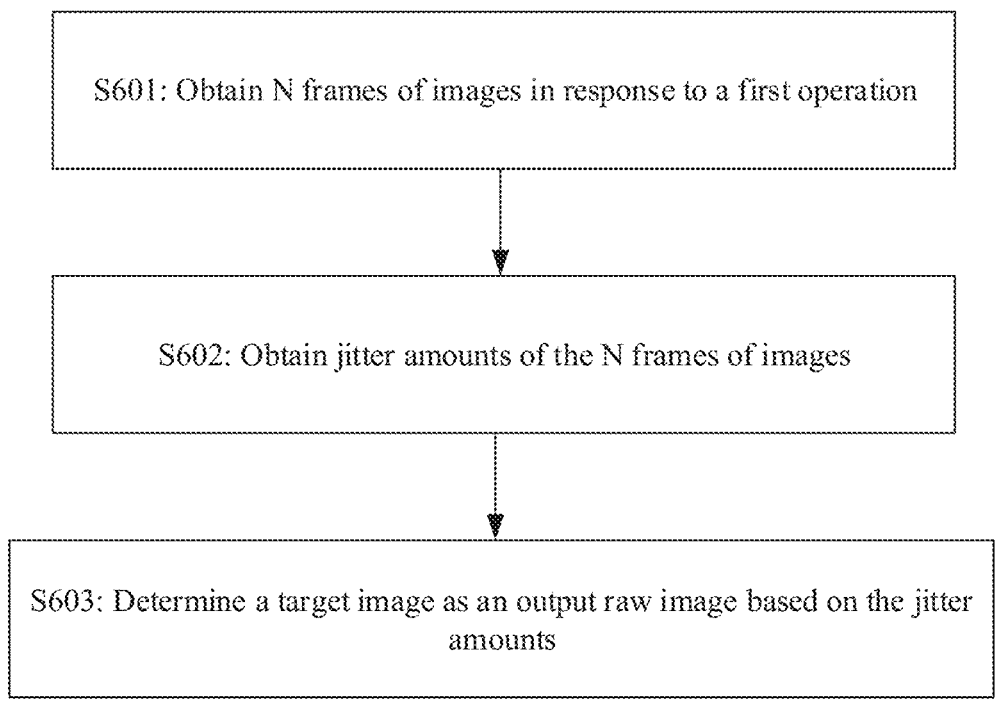
FIG. 6 is a schematic flowchart of a photographing method according to an embodiment of this application.

Referring to FIG. 6, FIG. 6 is a schematic flowchart of a photographing method according to an embodiment of this application. As shown in FIG. 6, the photographing method includes but is not limited to the following steps.

S601: An electronic device obtains N frames of images in response to a first operation.

The first operation may be an operation performed on a photographing control. For example, when a user enters a preview picture (as shown in (B) in FIG. 3), the user can tap the photographing control to perform photographing. In this case, the electronic device may receive the first operation from the user. When receiving the first operation, the electronic device may obtain N frames of images in response to the first operation.

During photographing by the user, generally, the user presses the photographing control to complete photographing when an image that the user likes appears in the preview picture. From determining, by the user, a picture that currently needs to be captured to pressing the photographing control and then to performing exposure by a shutter and an aperture of a camera in the electronic device, a picture obtained through exposure is no longer the picture that needs to be captured by the user. In this process, there is a specific delay between an exposure moment of a captured picture desired by the user and an exposure moment in actual photographing. In order that an image captured by the electronic device is a picture that a user wants to capture, that is, what you see is what you get, the delay needs to be taken into account in the process of obtaining the first image. In this case, the electronic device may first determine that a moment at which the first operation is obtained is a first moment, and determine, as the N frames of images, one or more frames of images obtained by a sensor at a moment near a moment of first duration before the first moment, where N is a positive integer.

The first duration may be about 100 ms, or may be other duration. This is not limited in this embodiment of this application. It should be noted that a delay from pressing the photographing control by a user of the electronic device to performing exposure by the shutter needs to be taken into account in determining of the first duration.

For example, it is assumed that a current first moment is 13:28:35.624 on Feb. 11, 2022, and a moment 100 ms (the first duration) previous to the current first moment is 13:28:35.524 on Feb. 11, 2022. The electronic device may determine N frames of images exposed starting from the moment of 13:28:35.524 on Feb. 11, 2022, for example, five frames of images exposed by the electronic device starting from 13:28:35.524 on Feb. 11, 2022, that is, the N frames of images that are obtained from the sensor. In this case, the electronic device may determine the five frames of images as the N frames of images. For another example, it is assumed that a current first moment is 13:28:35.624 on Feb. 11, 2022, and a moment 100 ms previous to the current first moment is 13:28:35.524 on Feb. 11, 2022. The electronic device may determine that images exposed in 10 ms near the moment of 13:28:35.524 on Feb. 11, 2022 are the N frames of images, that is, several frames of images obtained by the sensor in a time range from 13:28:35.514 on Feb. 11, 2022 to 13:28:35.534 on Feb. 11, 2022 are the N frames of images.

S602: The electronic device obtains jitter amounts of the N frames of images.

After obtaining the N frames of images, the electronic device may sequentially obtain the jitter amounts of all of the N frames of images.

To be specific, the electronic device may obtain gyro data in a plurality of pieces of consecutive timestamp information near the first duration before the first moment, and exposure time information of each line in the N frames of images. The electronic device may then determine the jitter amounts of the N frames of images based on the exposure time information and the gyro data.

For specific description of step S602, refer to related descriptions in FIG. 4 and FIG. 5. Details are not described again.

S603: The electronic device may determine a target image as an output raw image based on the jitter amounts.

The target image is an image that meets a jitter amount requirement and that is determined from the N frames of images based on the jitter amounts. The output raw image refers to an image that is output by the sensor of the camera. To be specific, the electronic device may obtain a plurality of images from the sensor of the camera in the electronic device, and select one of the images as an output image. Subsequent processing such as ISP and deblurring may be performed on the output raw image. The output raw image means that the frame of image is determined as an image obtained from the sensor of the camera and sent to a DSP, that is, a selected image in the sensor. The image is to be subjected to ISP processing, display, and the like.

In this embodiment of this application, there are different specific requirements for the image that meets the jitter amount requirement in the N frames of images, and determined target images are also different. The following specifically describes two possible cases.

In one possible implementation, the electronic device may first extract one frame of image from the N frames of images as a first image, and may then obtain a jitter amount of the first image. The electronic device may first compare the jitter amount of the first image and a preset threshold.

When the jitter amount of the first image is less than or equal to the preset threshold, the electronic device may determine the first image as the target image.

When the jitter amount of the first image is greater than the preset threshold, the electronic device may extract a next frame of the N frames of images as a new first image, and perform the step of obtaining a jitter amount of the first image (for example, S602). When the jitter amounts of all the N frames of images are greater than the preset threshold, the electronic device may determine an image with a minimum jitter amount in the N frames of images as the target image.

In this implementation, when an image meeting the preset threshold exists in the N frames of images, the image meeting the jitter amount requirement is an image whose jitter amount less than or equal to the preset threshold in the N frames, and one frame may be selected from the image as the target image. When no image in the N frames of images meets the preset threshold, the image meeting the jitter amount requirement is an image with a minimum jitter amount in the N frames.

It should be noted that the first image is merely one frame of image exposed by the electronic device, and the electronic device may sequentially expose a plurality of images to obtain a plurality of raw images. For example, when the electronic device can sequentially expose a plurality of frames of images as first images, the first frame of image is selected as the first image. In a subsequent process, the first image may be changed in sequence.

The preset threshold may range from 0.1 pixels to 1.0 pixel, for example, 0.3 pixels. A specific value of the preset threshold is not limited. The preset threshold can be used to effectively select the current first image. When the jitter amount is small, it indicates that the frame of image has a low jitter degree, and jitter of the electronic device cannot cause blurring of the frame of image. Therefore, the frame of image can be output from the sensor for subsequent processing, thereby ensuring sharpness and quality of the image.

When the jitter amount is large, the electronic device may make comparison based on the N frames of images, to determine whether an image with a jitter amount less than the preset threshold exists in a subsequent image in the N frames of images. In this way, an image meeting the preset threshold can be first selected as the output raw image as far as possible. If no image in the N frames of images meets the preset threshold, an image with a minimum jitter amount is selected. In this way, the electronic device ensures sharpness of the selected raw image as far as possible, thereby improving photographing experience of a user.

In another possible implementation, the electronic device may calculate a jitter amount of each of the N frames of images, and determine a frame of image with a minimum jitter amount as the target image. The target image may be used as the output raw image.

In this implementation, the image meeting the jitter amount requirement is the image with a minimum jitter amount in the N frames.

In this way, the electronic device can select the image with a minimum jitter amount in the N frames of images as the target image, to ensure that the output raw image is an image with best sharpness in the N frames of images.

Figure 7:
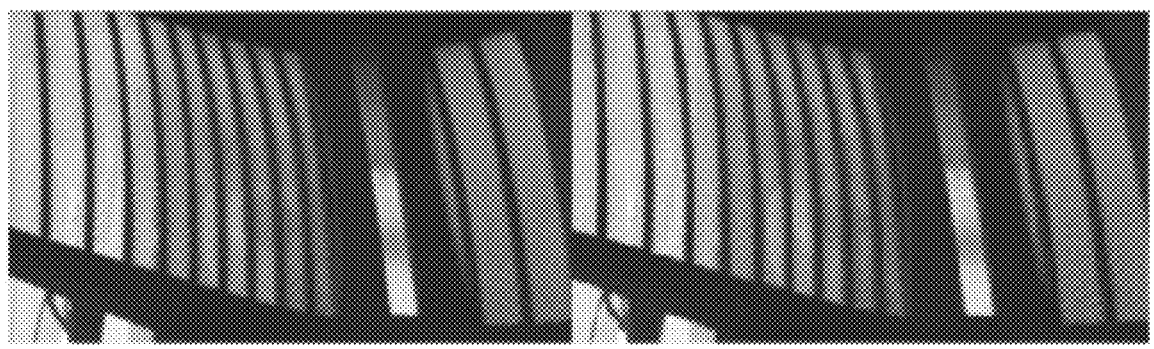
FIG. 7 is a schematic diagram of comparison between photographing effects according to an embodiment of this application.

FIG. 7 is a schematic diagram of comparison between photographing effects disclosed in an embodiment of this application. A left image is an image processed by using the photographing method in this embodiment of this application, and a right image is an image not processed by the photographing method in this embodiment. Through comparison between the two images, the left image is clearly visible and there are less noise points in the image, and the right image is blurry and has poor image quality. It can be learned from the effects of the two images that, the electronic device selects an image frame by using the jitter amount, so that an effect of an output image can be improved.

In the embodiments of this application, the electronic device selects a clearer image based on a jitter amount of an image, thereby improving quality and an effect of a captured image and improving photographing experience of a user.

The electronic device in the embodiments of this application has a photographing function. The technical solutions in the embodiments of this application may be applied to various photographing scenes. A type of the electronic device is not specifically limited in this application. In some embodiments, the electronic device in the embodiments of this application may be a portable device such as a mobile phone, a wearable device (for example, a smart band), a tablet computer, a laptop computer (laptop), a handheld computer, a computer, an ultra-mobile personal computer (UMPC), a cellular phone, a personal digital assistant (PDA), or an augmented reality (AR)/virtual reality (VR) device.

Figure 8:
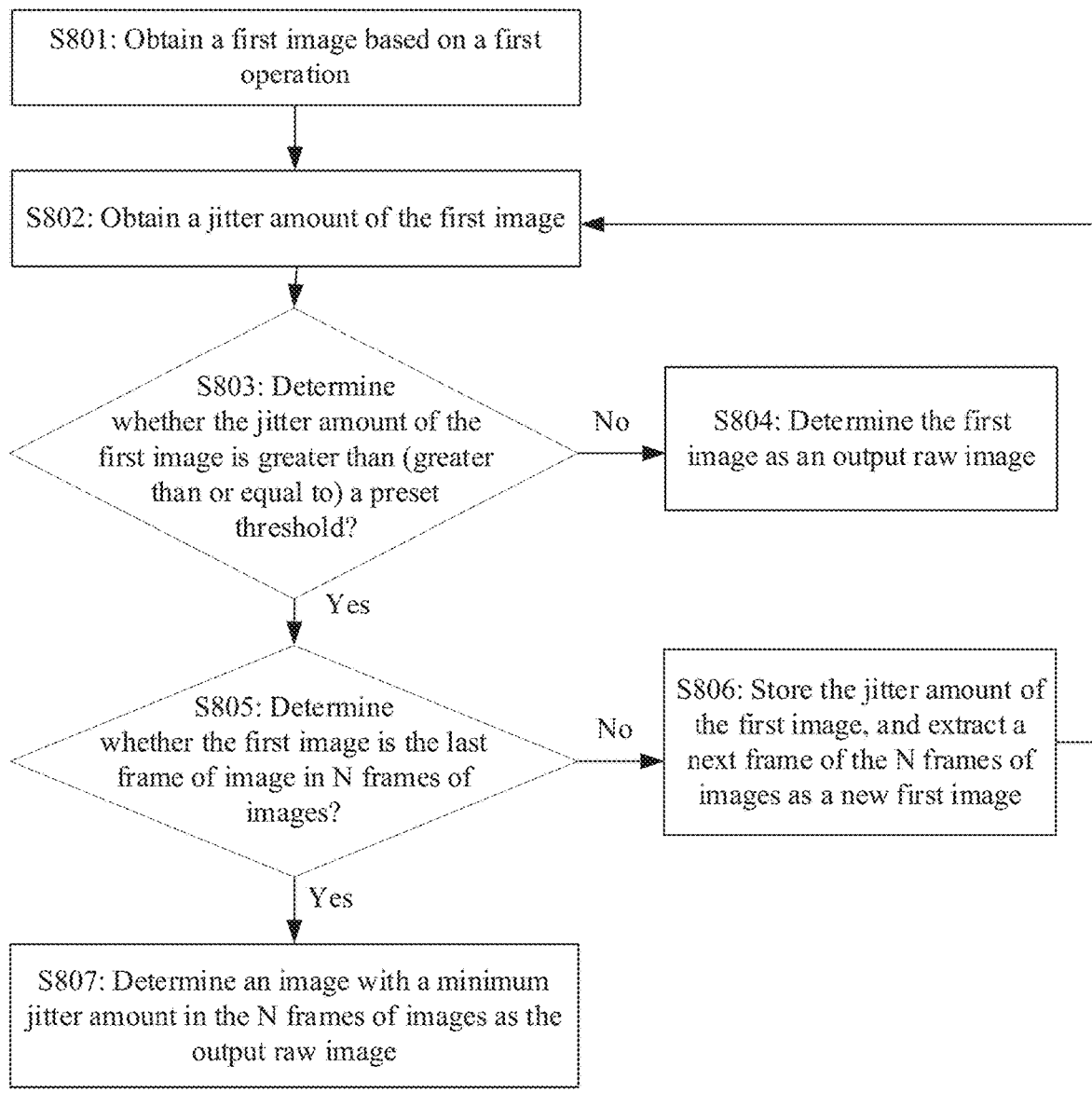
FIG. 8 is a schematic flowchart of another photographing method according to an embodiment of this application.

Referring to FIG. 8, FIG. 8 is a schematic flowchart of another photographing method according to an embodiment of this application. As shown in FIG. 8, the photographing method includes but is not limited to the following steps.

S801: An electronic device obtains a first image based on a first operation.

The electronic device may obtain N frames of images in response to the first operation, and then the electronic device may extract the first image from the N frames of images, that is, the electronic device may determine one of the N frames of images as the first image.

For description of the first operation in step S801, refer to description in step S601. Details are not described again.

S802: The electronic device obtains a jitter amount of the first image.

For step S802, refer to related descriptions in step S602 and in FIG. 4 and FIG. 5. Details are not described again.

S803: The electronic device determines whether the jitter amount of the first image is greater than (greater than or equal to) a preset threshold; and performs step S805 when the jitter amount of the first image is greater than or equal to the preset threshold; or performs step S804 when the jitter amount of the first image is not greater than or equal to the preset threshold.

For step S803, refer to description in step S603. Details are not described again.

S804: The electronic device determines the first image as an output raw image.

When the jitter amount of the first image is less than or equal to (less than) the preset threshold, the electronic device determines the first image as a target image, that is, the output raw image.

For step S804, refer to related description in step S603. Details are not described again.

S805: The electronic device determines whether the first image is the last frame of image in the N frames of images; and performs step S807 if the first image is the last frame of image in the N frames of images; or performs step S806 if the first image is not the last frame of image in the N frames of images.

When the jitter amount of the first image is greater than (greater than or equal to) the preset threshold, the electronic device determines whether the first image is the last frame of image in the N frames of images.

For step S805, refer to related description in step S603.

S806: The electronic device stores the jitter amount of the first image, extracts a next frame of the N frames of images as a new first image, and performs step S802 again.

When the jitter amount of the first image is greater than (greater than or equal to) the preset threshold, if the first image is not the last frame of the N frames of images, the jitter amount of the current first image is stored, the next frame of the N frames is determined as the new first image, and S802 is performed.

For step S806, refer to related description in step S603. Details are not described again.

S807: The electronic device determines an image with a minimum jitter amount in the N frames of images as the output raw image.

The electronic device has performed determining on all the N frames of images, and can sort the stored jitter amounts of the N frames of images, and determine the image with a minimum jitter amount in the N frames of images as the output raw image, that is, the target image.

When the jitter amount is large, the electronic device may make comparison based on the N frames of images, to determine whether an image with a jitter amount less than the preset threshold exists in a subsequent image in the N frames of images. In this way, an image meeting the preset threshold can be first selected as the output raw image as far as possible. If no image in the N frames of images meets the preset threshold, an image with a minimum jitter amount is selected. In this way, the electronic device ensures sharpness of the selected raw image as far as possible, thereby improving photographing experience of a user.

For step S807, refer to related description in step S603. Details are not described again.

A software system of the electronic device 100 may use a layered architecture, an event-driven architecture, a microkernel architecture, a microservice architecture, or a cloud architecture. In the embodiments of the present disclosure, an Android system with a layered architecture is used as an example to describe a software structure of the electronic device 100.

Figure 9:
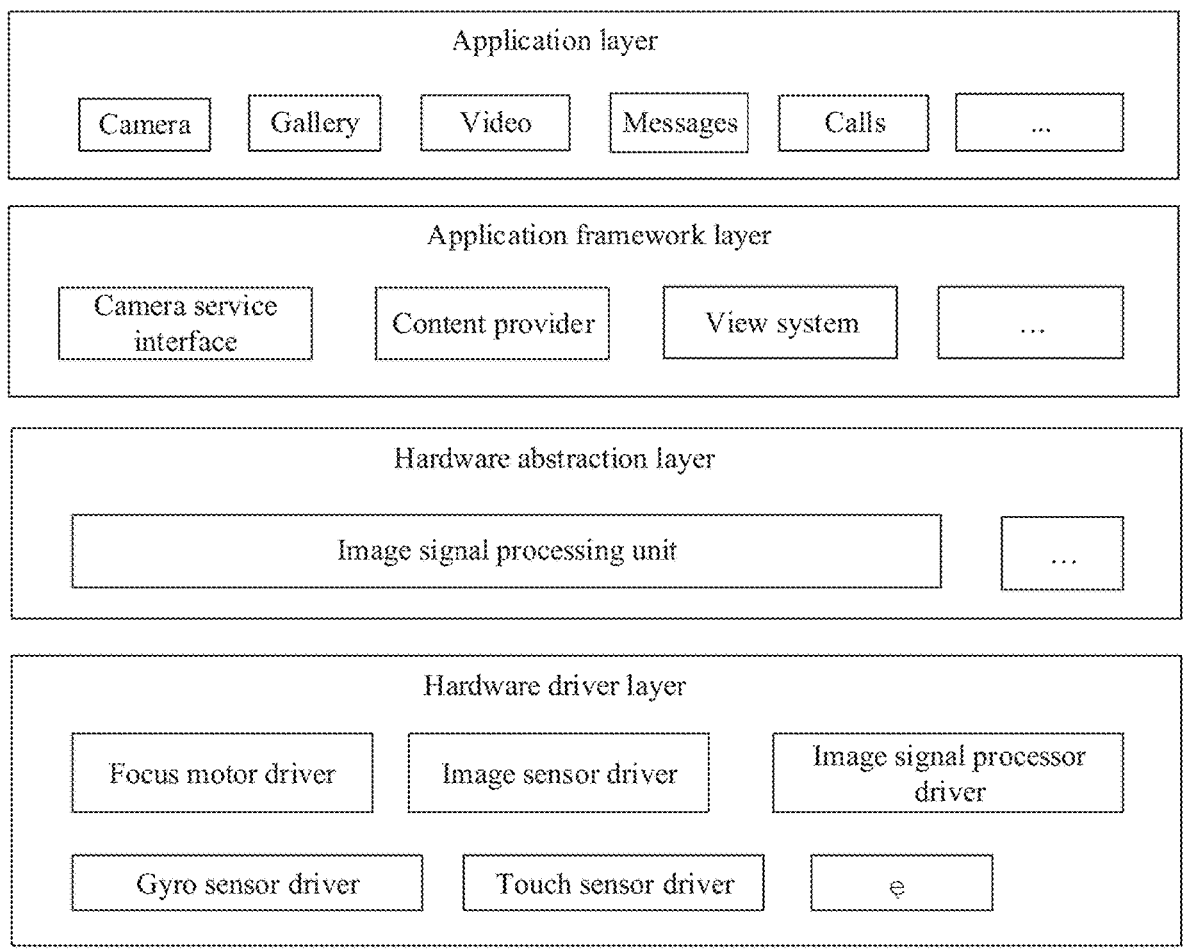
FIG. 9 is a schematic diagram of a software structure of an electronic device 100 according to an embodiment of this application.

FIG. 9 is a schematic block diagram of a software structure of an electronic device 100 according to an embodiment of this application.

A layered architecture divides software into several layers, and each layer has a clear role and task. The layers communicate with each other through a software interface. In some embodiments, the Android system is divided into four layers, which are respectively an application layer, an application framework layer, an Android runtime and a system library, and a kernel layer from top to down.

Referring to FIG. 9, FIG. 9 is an example block diagram of a software structure of an electronic device 100 according to an embodiment of this application. A layered architecture divides software into several layers, and each layer has a clear role and task. The layers communicate with each other through a software interface.

As shown in FIG. 9, the Android system is divided into four layers, which are respectively an application layer, an application framework layer, a hardware abstraction layer (HAL), and a hardware driver layer from top to down.

The application layer includes a series of application packages. For example, the application layer includes a Camera application but is not limited to the Camera application, and may further include other applications, for example, Camera, Gallery, Video, Messages, and Calls.

The Camera application may provide a photographing function for a user. In response to a touch operation performed by a user on a photographing control in a user interface of the Camera application, the Camera may instruct a coding module and an image processing module in the application framework layer to perform photographing.

The application framework layer (FWK) provides an application programming interface (API) and a programming framework for applications in the application layer. The application framework layer includes some predefined functions.

As shown in FIG. 9, the application framework layer may include a camera service interface, and the camera service interface may provide a communication interface between the Camera application in the application layer and the HAL layer.

As shown in FIG. 9, the HAL layer may include an image signal processing unit, and the image signal processing unit may be configured to provide the photographing method in this application to the Camera application. To be specific, after obtaining a first image of an image sensor and obtaining gyro data through driving by a gyro sensor, the image signal processing unit may start to process the first image by using the method in the embodiments of this application to obtain an output raw image. For details, refer to descriptions in FIG. 6 and FIG. 8. Details are not described again.

As shown in FIG. 9, the hardware driver layer may include modules such as a focus motor driver, an image sensor driver, an image signal processor driver, a gyro sensor driver, and a touch sensor driver.

The focus motor driver may control a focus motor to push a lens to perform focusing during photographing by a camera, and obtain focus information, for example, the focal length f in the embodiments of this application. The image sensor driver may obtain image information obtained by a sensor of the camera, for example, may obtain the first image in the embodiments of this application. The image signal processor driver may drive an image signal processor to process and calculate the first image. The gyro sensor driver is configured to obtain gyro data, and the touch sensor driver is configured to obtain a touch event, for example, the first operation.

As used in the foregoing embodiments, based on the context, the term "when" may be interpreted as a meaning of "if", "after", "in response to determining", or "in response to detecting". Similarly, based on the context, the phrase "when determining" or "if detecting (a stated condition or event)" may be interpreted as a meaning of "if determining . . . ", "in response to determining . . . ", "when detecting (a stated condition or event)", or "in response to detecting . . . (a stated condition or event)".

All or some of the foregoing embodiments may be implemented by software, hardware, firmware, or any combination thereof. When the software is used for implementation, the embodiments may be entirely or partially implemented in a form of a computer program product. The computer program product includes one or more computer indications. When the computer program indications are loaded and executed on a computer, all or some of the procedures or functions according to the embodiments of this application are generated. The computer may be a general-purpose computer, a dedicated computer, a computer network, or another programmable apparatus. The computer indications may be stored in a computer-readable storage medium or transmitted from one computer-readable storage medium to another computer-readable storage medium. For example, the computer indications may be transmitted from one website, computer, server, or data center to another website, computer, server, or data center in a wired (for example, a coaxial cable, an optical fiber, or a digital subscriber line) manner or a wireless (for example, infrared, wireless, or microwave) manner. The computer-readable storage medium may be any available medium accessible by a computer, or include one or more data storage devices such as a server or a data center integrating an available medium. The available medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures of the methods in the embodiments are implemented. The procedures may be completed by a computer program instructing related hardware. The program may be stored in a computer-readable storage medium. When the program is executed, the procedures in the foregoing method embodiments may be included. The foregoing storage medium includes any medium that can store program code, for example, a ROM, a random access memory RAM, a magnetic disk, or an optical disc.

What is claimed is:

1. A photographing method, wherein the method is applied to an electronic device, and the method comprises:
obtaining N frames of images in response to a first operation, wherein the first operation is an operation performed on a photographing control, the N frames of images are N frames of images in a preview picture that are collected by using a camera, and N is a positive integer; and
determining a target image as an output raw image in a process of sequentially obtaining jitter amounts of each frame of the N frames of images, wherein the output raw image is an image obtained by the electronic device by using a sensor of the camera, and the target image is an image that meets a jitter amount requirement and that is determined from the N frames of images based on the jitter amounts, wherein the determining the target image as the output raw image comprises:
extracting a first image from the N frames of images;
obtaining a jitter amount of the first image;

based on the jitter amount of the first image being less than or equal to a preset threshold, determining the first image as the target image;

based on the jitter amount of the first image being greater than the preset threshold, extracting a next frame of the N frames of images as a new first image, and performing the step of obtaining the jitter amount of the new first image; and based on the jitter amounts of each frame the N frames of images being greater than the preset threshold, determining an image with a minimum jitter amount in the N frames of images as the target image;

wherein the obtaining the jitter amount of the first image comprises:

obtaining gyro data of M lines in the first image, wherein M is a positive integer, and M is less than or equal to a quantity of pixel lines of the first image; and determining the jitter amount of the first image based on the gyro data of the M lines; and wherein the obtaining the gyro data of the M lines in the first image comprises:

obtaining exposure time information of the M lines in the first image, wherein the exposure time information comprises start moments and end moments of exposure of the M lines;

obtaining timestamp information and corresponding gyro data, wherein the timestamp information is information about time of collecting the corresponding gyro data; and based on the timestamp information being in exposure time information of a corresponding line in the M lines, obtaining gyro data in the exposure time information of the corresponding line.

2. The method according to claim 1, wherein the obtaining the N frames of images in response to the first operation comprises:

in response to the first operation, determining a moment of the first operation as a first moment; and obtaining consecutive N frames of images from the sensor starting from first duration before the first moment.

3. The method according to claim 1, wherein the determining the jitter amount of the first image based on the gyro data of the M lines comprises:

representing gyro data of an ith line in the M lines by using a jitter function $F_i$;

wherein $F_i = [g_{i\ 1}, g_{i\ 2}, \ldots, g_{i\ n}, \ldots, g_{i\ j}]$; and wherein j indicates that exposure of the ith line has gyro data corresponding to a total of j pieces of timestamp information;

integrating Q dimensions of gyro data corresponding to an nth piece of timestamp information in the j pieces of timestamp information of each of the M lines, to obtain a spatial location $p_{i\ n}$ corresponding to the nth piece of timestamp information of the ith line;

wherein $p_{i\ n} = f * \Sigma_1^Q g_{i\ n\ k} \cdot \Delta t_{i\ n}$; and wherein f is a focal length, k is an integer from 1 to Q, $g_{i\ n\ k}$ is data of a kth dimension in the gyro data in the nth piece of timestamp information of the ith line, and $\Delta t_{i\ n}$ is a time difference between the nth piece of timestamp information and a previous piece of timestamp information of the ith line;

determining a location function $p_i$ of the ith line based on the spatial location corresponding to each piece of timestamp information of the ith line;

wherein $p_i = [0, p_{i\ 1}, p_{i\ 2}, \ldots, p_{i\ j}]$; and wherein $p_{i\ j}$ represents the spatial location of the gyro data $g_{i\ j}$ corresponding to the jth piece of timestamp information of the ith line;

determining the jitter amount $S_i$ of the ith line as a difference between a maximum value and a minimum value in the location function $p_i$ of the ith line;

wherein $S_i = \max(pi) - \min(pi)$; and wherein max(pi) is a maximum value in j location functions of the ith line, and min(pi) is a minimum value in the j location functions of the ith line; and determining the jitter amount S of the first image as an average value of jitter amounts of the M lines, wherein $$S = \frac{1}{M} \sum_1^M S_i.$$

4. The method according to claim 3, wherein the method further comprises:

obtaining an optical compensation amount corresponding to each piece of timestamp information of the ith line;

wherein the determining the location function $p_i$ of the ith line based on the spatial location corresponding to each piece of timestamp information of the ith line further comprises:

determining, based on the spatial location and the optical compensation amount that correspond to each piece of timestamp information of the ith line, that the location function $p_i$ of the ith line is: $p_i = [0, p_{i\ 1} - o_{i\ 1}, p_{i\ 2} - o_{i\ 2}, \ldots, p_{i\ j} - o_{i\ j}]$;

wherein $o_{i\ j}$ is the optical compensation amount corresponding to the jth piece of timestamp information of the ith line.

5. The method according to claim 1, wherein the preset threshold ranges from 0.1 pixels to 1.0 pixel.

6. An electronic device, comprising:

a touchscreen;

one or more processors; and one or more memories, wherein the one or more processors are coupled to the touchscreen and the one or more memories, the one or more memories are configured to store computer program code, the computer program code comprises computer instructions, and when the one or more processors execute the computer instructions, the electronic device is enabled to perform the method according to claim 1.

7. A non-transitory computer-readable storage medium, comprising instructions that, when run on an electronic device, cause the electronic device to perform the method according to claim 1.

* * * * *